(12) United States Patent
Eickhoff et al.

(10) Patent No.: US 9,624,450 B2
(45) Date of Patent: Apr. 18, 2017

(54) HIGH-PERFORMANCE HYDROLYSIS FUEL FORMULATION FOR MICRO FUEL CELLS

(71) Applicant: Honeywell International Inc., Morristown, NJ (US)

(72) Inventors: Steven J. Eickhoff, Brooklyn Park, MN (US); Stephen Kenyon Swanson, Maple Grove, MN (US)

(73) Assignee: Honeywell International Inc., Morris Plains, NJ (US)

( * ) Notice: Subject to any disclaimer, the term of this patent is extended or adjusted under 35 U.S.C. 154(b) by 421 days.

(21) Appl. No.: 14/202,613

(22) Filed: Mar. 10, 2014

(65) Prior Publication Data

US 2014/0259892 A1    Sep. 18, 2014

Related U.S. Application Data

(60) Provisional application No. 61/777,435, filed on Mar. 12, 2013.

(51) Int. Cl.
| | | |
|---|---|---|
| *C01B 6/06* | (2006.01) | |
| *C01B 3/06* | (2006.01) | |
| *C01B 3/08* | (2006.01) | |
| *C10L 5/44* | (2006.01) | |

(52) U.S. Cl.
CPC ............... *C10L 5/44* (2013.01); *C01B 3/065* (2013.01); *C01B 6/06* (2013.01); *Y02E 50/10* (2013.01); *Y02E 50/30* (2013.01); *Y02E 60/362* (2013.01)

(58) Field of Classification Search
CPC ... C01B 3/065; C01B 6/06; C10L 5/44; Y02E 50/10; Y02E 60/362; Y02E 50/30
See application file for complete search history.

(56) References Cited

U.S. PATENT DOCUMENTS

| | | | | |
|---|---|---|---|---|
| 5,443,616 | A * | 8/1995 | Congdon | B22F 1/0003 419/2 |
| 6,228,338 | B1 | 5/2001 | Petrie | |
| 7,837,976 | B2 * | 11/2010 | Sandrock | C01B 3/0026 252/182.35 |
| 7,901,816 | B2 | 3/2011 | Eickhoff et al. | |
| 2007/0068071 | A1 * | 3/2007 | Kelly | C01B 3/065 44/905 |
| 2008/0236032 | A1 * | 10/2008 | Kelly | C01B 3/02 44/628 |
| 2010/0040937 | A1 * | 2/2010 | Finkelshtain | H01M 8/1009 429/494 |

FOREIGN PATENT DOCUMENTS

MO    WO-2008/118437 A2    10/2008

OTHER PUBLICATIONS

"European Application Serial No. 14158691.7, European Search Report mailed May 26, 2014", 4 pgs.

(Continued)

*Primary Examiner* — Pamela H Weiss
(74) *Attorney, Agent, or Firm* — Schwegman Lundberg & Woessner, P.A.

(57) ABSTRACT

Embodiments of the present invention relate to a hydrogen generating fuel comprising grains comprising a promoter and AlH$_3$, each grain having a size between 1 and 10 μm. In some embodiments, the grains can be pressed into a porous pellet.

11 Claims, 1 Drawing Sheet

(56) References Cited

OTHER PUBLICATIONS

Sandrock, G. et al., "Accelerated thermal decomposition of AlH$_3$ for hydrogen-fueled vehicles", *Applied Physics A*, 80(4), (2005), 687-690.
Sandrock, G., et al., "Alkali metal hydride doping of α-AlH$_3$ for enhanced H$_2$ desorption kinetics", *Journal of Alloys and Compounds*, 421(1-2), (2006), 185-189.
Teprovich, J. A., et al., "Hydrogen system using novel additives to catalyze hydrogen release from the hydrolysis of alane and activated aluminum", *International Journal of Hydrogen Energy*, 37(2), (2012), 1594-1603.
"European Application Serial No. 14158691.7, Office Action mailed Jun. 27, 2014", 6 pgs.
"European Application Serial No. 14158691.7, Respose filed Dec. 19, 2014 to Office Action mailed Jun. 27, 2014", 15 pgs.
Brower, Frank M., et al., "Preparation and properties of aluminum hydride", *J. Am. Chem. Soc.*, 98(9), (1976), 2450-2453.

\* cited by examiner

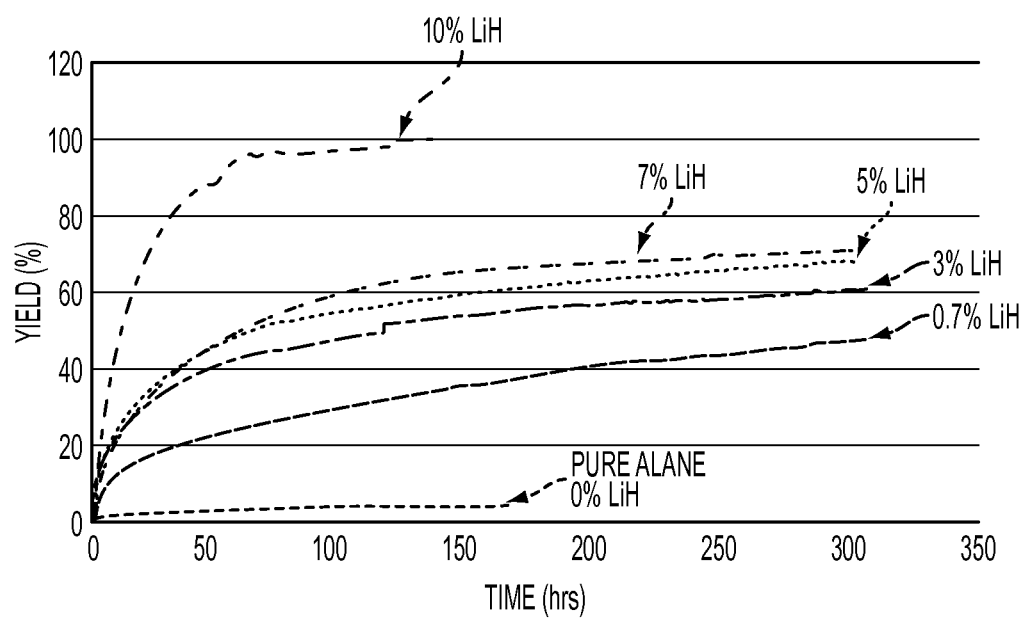

HIGH-PERFORMANCE HYDROLYSIS FUEL FORMULATION FOR MICRO FUEL CELLS

CROSS-REFERENCE TO RELATED APPLICATIONS

This application claims priority to U.S. Provisional Application Ser. No. 61/777,435, filed Mar. 12, 2013, which is incorporated herein by reference in its entirety.

BACKGROUND

Aluminum hydride ($AlH_3$), also referred to as "alane," is an attractive hydrogen storage material for portable fuel cells due to its high theoretical hydrogen storage density when reacted with liquid water (hydrolysis reaction), and its potential for low cost in high-volume production. Pure alane, however, reacts slowly with water (liquid or vapor) due to a passivation layer (oxide) which forms on the grain surface and reduces the diffusion rate of water to the unreacted core. The reaction rate of pure alane with water is too slow to be useful for portable fuel cells.

Recent work by Teprovich et. al. (*International Journal of Hydrogen Energy* 37: 1594-1603 (2012)) describes that the addition of a promoter additive (PA) such as a metal hydroxide (e.g., NaOH) or metal hydride (e.g., LiH) can improve the reaction rate of alane with liquid water. It is thought that the strongly-basic solution that forms when liquid water is introduced to the alane-PA mixture is able to effectively dissolve the oxide passivation layer that forms on the surface of the alane particles, enabling a higher reaction rate. But the need for liquid water makes systems such as Teprovich's inefficient when one accounts for the weight of the liquid water that must be carried "on board." There is therefore a need for an alane hydrolysis system that does not require carrying a significant amount of liquid water on board to effect the hydrolysis of the alane.

SUMMARY

The present disclosure provides systems and method for hydrolyzing alane using water in the gas phase. One advantage of the methods and systems described herein for hydrolyzing alane, therefore, is that they do not require carrying a significant amount of water on board. Another advantage of the methods and systems described herein for hydrolyzing alane is that they control and prevent any runaway reactions in which large quantities of $H_2$ and heat are released upon the addition of liquid water.

In various embodiments, the present invention provides a hydrogen generating fuel comprising a combination of a promoter with $AlH_3$, each have a grain size between 1 and 10 μm, the grains being pressed into a porous pellet.

In various other embodiments, the prevent invention provides a method comprising: obtaining a promoter and $AlH_3$ powders broken down into grains having a size of between 1 and 10 μm; mixing the powders; and forming a porous pellet from the mixed powders.

In various embodiments, the present invention provides a method for hydrolyzing alane comprising providing or obtaining a hydrogen generating fuel comprising alane and a promoter; and contacting the hydrogen generating fuel with water in the vapor phase. In some embodiments, the hydrogen generating fuel is not at all contacted with water in the liquid phase. In some embodiments, the hydrogen generating fuel is in the form of particles, wherein each particle has an average particle size between 1 and 10 μm.

In some embodiments, the particles are pressed into a porous pellet. In some embodiments, the porous pellet can have an initial pellet density, after the pellet is made and before it is used in the methods for hydrolyzing alane described herein. In some embodiments, the initial pellet density is from about 0.90 $g/cm^3$ to about 1.25 $g/cm^3$, about 0.95 $g/cm^3$ to about 1.10 $g/cm^3$, about 1.00 $g/cm^1$ to about 1.22 $g/cm^3$ or about 0.90 $g/cm^3$ to about 1.22 $g/cm^3$.

In various other embodiments, the present invention provides a method for generating hydrogen ($H_2$) comprising providing or obtaining a hydrogen generating fuel comprising alane and a promoter; and contacting the hydrogen generating fuel with water in the vapor phase.

In still other embodiments, the present invention provides a system for generating hydrogen ($H_2$) comprising a hydrogen generating fuel comprising alane and a promoter; and water in the vapor phase.

BRIEF DESCRIPTION OF THE DRAWINGS

Hereinafter referred to as the FIGURE is a plot of percent yield versus time for various mass percentages of promoter additive with LiH according to an example embodiment.

DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that changes may be made without departing from the scope of the present invention. The following description of example embodiments is, therefore, not to be taken in a limited sense, and the scope of the present invention is defined by the appended claims.

In various embodiments, the present invention provides a method for hydrolyzing alane comprising providing or obtaining a hydrogen generating fuel comprising alane and a promoter; and contacting the hydrogen generating fuel with water in the vapor phase. In some embodiments, the hydrogen generating fuel is not at all contacted with water in the liquid phase to effect the hydrolysis of alane.

The water in the vapor phase used to contact the hydrogen generating fuel may be produced in any suitable way. For example, water in the vapor phase may be produced by evaporation, boiling, or as a byproduct of the operation of a separate fuel cell that converts hydrogen and oxygen into water molecules. See U.S. Pat. No. 7,901,816, incorporated by reference herein in its entirety, describes one example of a fuel cell that produces by-product water in the vapor phase.

The terms "aluminum hydride," "$AlH_3$," and "alane" are used interchangeably herein. Non-solvated alane exhibits six crystalline phases (polymorphs), with each having different physical properties. See, e.g., U.S. Pat. No. 6,228,338 and F. M. Brower et al., *J Am. Chem. Soc.* 98: 2450 (1976), both of which are incorporated by reference as if fully set forth herein. The phase designated as α'-alane is essentially non-solvated and appears under a polarizing microscope as small multiple needles growing from single points to form fuzzy balls. The γ phase appears as bundles of fused needles. The γ phase is produced in conjunction with the β phase, and both γ- and β-alane are metastable nonsolvated phases that convert to the more stable α-alane upon heating. The α-alane is the most stable, and is characterized by hexagonal or cubic shaped crystals that are typically 50-100 μm in size.

The other two forms, designated δ- and ε-alane, are formed when a trace of water is present during crystallization, and the C-alane is prepared by crystallizing from di-n-propyl ether. The α', δ, ε and ζ polymorphs do not convert to the α-alane and are less thermally stable than the α-form. Still, the terms "aluminum hydride," "AlH₃," and "alane" refer to all of the known polymorphs of alane. In a preferred embodiment, the alane is α-alane.

The hydrogen generating fuel of the various embodiments of the present invention comprises a promoter, which may also be referred to herein as a "promoter additive," in addition to alane. The promoter can be any suitable promoter. Suitable promoters comprise an alkali metal (e.g., Li, Na, K, Rb, Cs, and Fr) or an alkali earth metal (e.g., Be, Mg, Ca, Sr, Ba, and Ra) and can be an alkali metal or an alkali earth metal hydroxide, such as NaOH. Other suitable promoters comprise ionic metal hydrides (e.g., LiH), covalent metal hydrides (e.g., di-iso-butyl aluminum hydride), and non-metal hydrides (e.g., silanes, phosphanes, and boranes). In some embodiments, the promoter can be at least one of $LiAlH_4$, $NaAlH_4$, $KAlH_4$, $MgAlH_4$, $CaH_2$, $LiBH_4$, $NaBH_4$, $LiH$, and $MgH_2$.

Promoters also include any material that is capable of generating hydroxide ions (OH) in situ, amines (e.g., triethylamine and pyrrolidine); and ammonium, alkali, and alkali earth metal carbonates and bicarbonates or combinations thereof. Without limitation, examples of suitable alkali and alkali earth metal carbonates and bicarbonates include $Na_2CO_3$, $K_2CO_3$, $CaCO_3$, $MgCO_3$, $NaHCO_3$, $KHCO_3$.

The hydrogen generating fuel of the embodiments of the present invention can comprise the promoter in any suitable amount. In some embodiments, the amount of promoter present in the hydrogen generating fuel of the embodiments of the present invention is an amount sufficient to increase the percent alane hydrolysis yield by 10- to 100-fold, 20- to 100-fold, 35- to 100 fold, 45- to 100-fold, 55- to 100-fold over a period of, e.g., 50 minutes, 100 minutes, 150 minutes or more, relative to a hydrogen generating fuel lacking the promoter and that contains, e.g., only alane. In some embodiments, the promoter mass percentage present in the hydrogen generating fuel of the embodiments of the present invention is about 0.1% to about 20%, about 0.1 to about 15%, about 0.5 to about 15%, about 0.7 to about 10%, about 1% to about 12%, about 2% to about 7% or about 2% to about 10% of the mass of the alane used in the hydrogen generating fuel of the embodiments of the present invention. In a preferred embodiment, the mass percent of promoter present in the hydrogen generating fuel of the embodiments of the present invention is about 10%.

The hydrogen generating fuel of the embodiments of the present invention can be in any suitable form, including, but not limited to particles having various shapes and forms including, but not limited to, pellets, spheroids, cubes, grains, and powders. In some embodiments the particles have an average particle size of not more than 500 μm and include particles having an average particle size of about 0.01 μm to about 500 μm; about 0.05 μm to about 10 μm; about 0.5 μm to about 5 μm; about 1 μm to about 10; about 10 to about 50 μm; about 30 to about 100 μm; about 50 to about 100 μm; or about 50 to about 250 μm. In some embodiments, the hydrogen generating fuel is in the form of grains having any suitable size. In other embodiments, each grain has a grain size between 1 μm and 10 μm. In still other embodiments, each grain has a grain size of about 5 μm.

The hydrogen generating fuel of the embodiments of the present invention can be prepared in any suitable way using any suitable method for producing micron-sized and sub-micron-sized particles. Known methods for making micron-sized and sub-micron-sized particles include, but are not limited to air-jet milling or dry powder ball milling. In some embodiments, the alane and/or the promoter are subjected to known methods for reducing particle size and the size of the particles of alane and the promoter need not be the same.

The alane particle size can be any suitable particle size having an average particle size of not more than 500 μm and include particles having an average particle size of about 0.01 μm to about 500 μm; about 0.05 μm to about 10 μm; about 0.5 μm to about 5 μm; about 1 μm to about 10; about 10 to about 50 μm; about 30 to about 100 μm; about 50 to about 100 μm; or about 50 to about 250 μm.

Similarly, the promoter particle size can be any suitable particle size having an average particle size of not more than 500 μm and include particles having an average particle size of about 0.01 μm to about 500 μm; about 0.05 μm to about 10 μm; about 0.5 μm to about 5 μm; about 1 μm to about 10; about 10 to about 50 μm; about 30 to about 100 μm; about 50 to about 100 μm; or about 50 to about 250 μm.

The alane and promoter (e.g., particles of alane and promoter) used in the hydrogen generating fuel of the embodiments of the present invention can pressed into larger forms including one or more (a plurality) of porous pellets. For example, particles (e.g., powders) of alane and promoter can be mixed (e.g., using a mortar and pestle) and subsequently pressed into a plurality of porous pellets having a density of about 0.5 $g/cm^3$ to about 1.5 $g/cm^3$, about 0.5 $g/cm^3$ to about 1.0 $g/cm^3$ or about 0.7 $g/cm^3$ to about 0.92 $g/cm^3$ using any suitable means, including, but not limited to using a pellet press. In some embodiments, the porous pellet can have an initial pellet density, after the pellet is made and before it is used in the methods for hydrolyzing alane described herein. In some embodiments, the initial pellet density is from about 0.90 $g/cm^3$ to about 1.25 $g/cm^3$, about 0.95 $g/cm^3$ to about 1.10 $g/cm^3$, about 1.00 $g/cm^1$ to about 1.22 $g/cm^3$ or about 0.90 $g/cm^3$ to about 1.22 $g/cm^3$.

In some embodiments, a lower density (e.g., 0.7 $g/cm^3$) can increase the reaction rate of the hydrogen generating fuel of the embodiments of the present invention, sometimes at the expense of energy density. Conversely, a higher density (e.g., 0.92 $g/cm^3$) can increase energy density of the hydrogen generating fuel of the embodiments of the present invention, sometimes at the expense of the reaction rate.

In some embodiments, using more of a lower energy density promoter than is necessary to achieve a desired reaction rate will reduce the total amount of hydrogen produced per unit volume and mass of the pellet, which is undesirable.

In some embodiments, the one or more pellets can be pressed with geometric features such that the one or more pellets comprise geometric features on a portion of their surface or on substantially their entire surface. While not wishing to be bound by any particularly theory, it is believed that the geometric features, among other things, provide expansion volume for the reaction products of the alane hydrolysis reaction.

In some embodiments, the one or more pellets further comprise spacers disposed therein. The spacers can be any suitable spacers known in the art including porous and non-porous spacers. Examples of spacers contemplated herein include at least one of sintered metal and ceramic plugs.

In addition to or instead of spacers, channels can be molded into the one or more pellets. While not being bound by any particular theory, it is believed that channels molded into the pellet can serve as both low-resistance diffusion paths to increase the average reaction rate, and provide expansion volume for the reaction products of the alane hydrolysis reaction. Those of skill in the art, with the benefit of this disclosure, would be able to determine an appropriate or optimum number of spacers or channels that could be incorporated into or molded onto the one or more pellets to obtain an appropriate alane hydrolysis reaction rate.

The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those of ordinary skill in the art, and that such modifications and variations are considered to be within the scope of this invention as defined by the appended claims.

EXAMPLES

The present invention can be better understood by reference to the following examples which are offered by way of illustration. The present invention is not limited to the examples given herein.

Example 1

Although the addition of a promoter additive (PA) to alane is effective at increasing the rate of the liquid-water hydrolysis reaction, it was not known if it would have the same effect on the water-vapor hydrolysis reaction, which is a preferred way of generating hydrogen. It was also not known if the amount of PA would affect the reaction rate and completion of the reaction in the same way as for liquid-water hydrolysis. The study described below provides at least one example of a hydrogen generating fuel for water-vapor alane hydrolysis. The study explores the effects of the particle size, porosity, PA mole fraction of the hydrogen generating fuel on percent yield over time of alane hydrolysis.

Liquid water differs from water vapor in significant ways. Water vapor is the gas phase of liquid water. Water vapor may be produced by evaporation, or by operation of a fuel cell converting hydrogen and oxygen into water molecules. As water molecules transition between a more associated or liquid state and a less associated or vapor/gas state, it does so through the release or absorption of kinetic energy. Some embodiments of the present invention exclude the use of steam as a source of water vapor.

To facilitate a reaction with water vapor, raw LiH and $AlH_3$ powders are broken down into ~5 μm grains using a jet milling process. Depending on the desired reaction rate (see the FIGURE) $AlH_3$ and LiH are mixed using a mortar and pestle, or other similar physical mixing process. The mixed powders are packed to a desired density (0.7 to 0.92 g/cc) using a pellet press. The desired density is determined based on the desired reaction rate profile and energy density. The FIGURE illustrates a percent yield over time of alane hydrolysis with LiH promoter.

Pure alane reacts slowly with water vapor, primarily because an oxide layer passivates particle surfaces. The reaction of pure alane with water is therefore too slow to be useful in, among other things, micro fuel cells. A promoter (e.g., hydroxide and hydroxide precursor) increases reaction rate. LiH is a highly effective reaction promoter. Other promoters, such as NaOH, or hydrides, such as $LiAlH_4$, are also effective, though higher promoter mass percentages may be required to achieve the same reaction rate as, e.g., LiH.

As shown in the FIGURE, the reaction rates can be tuned by tailoring the mass fraction of the promoter, LiH. For a hydrogen generating fuel comprising alane and LiH, the optimal grain size was found to be about 1 μm to about 10 μm. Experiments were performed with ~5 μm grain size.

Values expressed in a range format should be interpreted in a flexible manner to include not only the numerical values explicitly recited as the limits of the range, but also to include all the individual numerical values or sub-ranges encompassed within that range as if each numerical value and sub-range were explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. In addition, it is to be understood that the phraseology or terminology employed herein, and not otherwise defined, is for the purpose of description only and not of limitation. Any use of section headings is intended to aid reading of the document and is not to be interpreted as limiting. Further, information that is relevant to a section heading may occur within or outside of that particular section. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods described herein, the steps can be carried out in any order without departing from the principles of the invention, except when a temporal or operational sequence is explicitly recited. Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The present invention provides for the following example embodiments, the numbering of which is not to be construed as designating levels of importance:

Embodiment 1 relates to a hydrogen generating fuel comprising a combination of a promoter with $AlH_3$, each have a grain size between 1 and 10 µm, the grains being pressed into a porous pellet.

Embodiment 2 relates to the hydrogen generating fuel of Embodiment 1, wherein the promoter is a hydroxide precursor.

Embodiment 3 relates to the hydrogen generating fuel of Embodiments 1-2 and further comprising spacers disposed in the porous pellet.

Embodiment 4 relates to the hydrogen generating fuel of Embodiments 1-3, wherein the spacers comprise at least one of sintered metal and ceramic plugs.

Embodiment 5 relates to the hydrogen generating fuel of Embodiments 1-4, wherein the pellet has a density of 0.7 to 0.92 $g/cm^3$.

Embodiment 6 relates to the hydrogen generating fuel of Embodiments 1-5, wherein the promoter comprises at least one of an ionic metal hydride, a covalent metal hydride, an alkali metal, an alkaline earth metal and a metal hydroxide.

Embodiment 7 relates to the hydrogen generating fuel of Embodiments 1-6, wherein the promoter comprises LiH.

Embodiment 8 relates to the hydrogen generating fuel of Embodiments 1-6, wherein the promoter comprises $LiAlH_4$.

Embodiment 9 relates to the hydrogen generating fuel of Embodiments 1-6, wherein the promoter comprises NaOH.

Embodiment 10 relates to the hydrogen generating fuel of Embodiments 1-9, wherein the promoter mass percentage is between 0.7% and 10.0% of the mass of pure alane.

Embodiment 11 relates to the hydrogen generating fuel of Embodiments 1-10, wherein pellets are formed with geometric features to provide expansion volume for reaction products.

Embodiment 12 relates to a method comprising: obtaining a promoter and AlH3 powders broken down into grains having a size of between 1 and 10 µm; mixing the powders; and forming a porous pellet from the mixed powders.

Embodiment 13 relates to the method of Embodiment 12, wherein the promoter comprises at least one of an ionic metal hydride, a covalent metal hydride, an alkali metal, an alkaline earth metal, and a metal hydroxide.

Embodiment 14 relates to the method of Embodiments 12-13, wherein the promoter comprises LiH.

Embodiment 15 relates to the method of Embodiments 12-13, wherein the promoter comprises $LiAlH_4$.

Embodiment 16 relates to the method of Embodiments 12-13, wherein the promoter comprises NaOH.

Embodiment 17 relates to the method of Embodiments 12-16, wherein the promoter mass percentage is between 0.7% and 10.0% of the mass of pure alane.

Embodiment 18 relates to the method of Embodiments 12-17, wherein pellets are formed with geometric features to provide expansion volume for reaction products.

Embodiment 19 relates to the method of Embodiments 12-18, further comprising adding porous spacers to the mixed powder prior to forming the porous pellet.

Embodiment 20 relates to the method of Embodiment 19, wherein the spacers comprise at least one of sintered metal and ceramic plugs.

Embodiment 21 relates to the method of Embodiments 12-20, wherein the pellet has a density of 0.7 to 0.92 $g/cm^3$.

The invention claimed is:

1. A porous hydrogen generating fuel pellet comprising a plurality of grains comprising a combination of a promoter selected from the group consisting of ionic metal hydride, a covalent metal hydride, an alkali metal, an alkaline earth metal, a metal hydroxide, and combinations thereof, with $AlH_3$, each grain having a grain size by diameter between 1 and 10 µm, the plurality of grains being pressed into a porous hydrogen generating fuel pellet;
wherein:
the pellet has a density of 0.7 to 0.92 $g/cm^3$; and
the promoter mass percentage is between 0.7% and 10.0% of the mass of $AlH_3$ present in the porous hydrogen generating fuel pellet.

2. The hydrogen generating fuel of claim 1, wherein the promoter is capable of generating hydroxide ions.

3. The hydrogen generating fuel of claim 1 and further comprising at least one of sintered metal or ceramic plugs disposed in the porous pellet.

4. The hydrogen generating fuel of claim 1, wherein the promoter comprises LiH.

5. The hydrogen generating fuel of claim 1, wherein the promoter comprises $LiAlH_4$.

6. The hydrogen generating fuel of claim 1, wherein the promoter comprises NaOH.

7. A method comprising:
obtaining a powder comprising a combination of a promoter selected from the group consisting of ionic metal hydride, a covalent metal hydride, an alkali metal, an alkaline earth metal, a metal hydroxide, and combinations thereof, and $AlH_3$, the powder broken down into a plurality of grains, each grain having a grain size by diameter between 1 and 10 µm; and
forming a porous hydrogen generating pellet from the powder;
wherein:
the pellet has a density of 0.7 to 0.92 $g/cm^3$; and
the promoter mass percentage is between 0.7% and 10.0% of the mass of $AlH_3$ present in the powder.

8. The method of claim 7, wherein the promoter comprises LiH.

9. The method of claim 7, wherein the promoter comprises $LiAlH_4$.

10. The method of claim 7, wherein the promoter comprises NaOH.

11. The method of claim 7 further comprising adding at least one of sintered metal or ceramic plugs to the powder prior to forming the porous pellet.

* * * * *